May 19, 1959  W. RATH  2,887,557
SILICONES
Filed June 29, 1954
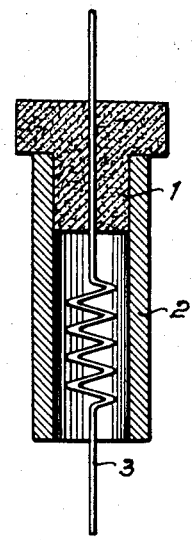
INVENTOR
Werner RATH
By: [signature]
Attorney

United States Patent Office 2,887,557
Patented May 19, 1959

2,887,557

SILICONES

Werner Rath, Schonberg, near Lauf (Pegnitz), Germany, assignor to Stettner & Co., Fabrik Elektro-Keramischer Artikel, Lauf (Pegnitz), Germany, a firm of Germany Application June 29, 1954, Serial No. 440,221

8 Claims. (Cl. 201—67)

The present invention relates to synthetic materials generally known as silicones, and to a new method of producing such materials with qualities heretofore unknown therein.

These synthetic materials form a group of highly molecular compounds which, contrary to the well-known highly molecular carbon compounds, are formed of Si—O—Si chains. Such groups which are combined with hydrocarbon radicals, i.e., for example, the dimethyl silicon oxide polymers and similar compounds, may be produced in the form of oils, pastes, and resins. The polymerization is carried out by a hardening process at a temperature of approximately 200 to 300° C. for a length of time which is decreased as the temperature is increased. The silicone resins may be provided with fillers and then molded under pressure into a suitable shape whereupon they may be hardened to form solid bodies which may be compared with the well-known synthetic resin products, for example, those made of molded phenol formaldehyde known under the name of Bakelite. The main advantage of the silicones over other known molded materials consists in their increased stability under higher temperatures.

Numerous silicones which are very useful for many industrial purposes have previously been made and are permanently able to withstand temperatures of about 200° C., as well as temporarily up to 300° C. However, the attempts to produce a molded silicone plastic and plastic objects similar to Bakelite or like materials have previously been unsuccessful due to the fact that the ability of silicones to flow or fuse at the most suitable temperature, i.e. at approximately 110° C., is considerably lower than that of the known plastics of highly polymerized carbon compounds. Thus, silicones lend themselves to being molded under pressure much less than other plastics. Furthermore, the mechanical solidity of such molded silicone products is relatively low, even if the hardening treatment thereof is not limited to one in a heated mold but continued outside of the mold in a suitable apparatus at temperatures up to 300° C. and for a period of time up to one hour.

The primary object of the invention is to produce a new type of molded material and products containing silicone resins, for example, for electrotechnical purposes, and to devise a new method of making the same.

More particularly, it is the object of the invention to produce a new molded plastic consisting of a mixture of silicone resin which constitutes the moldable part thereof, and a certain amount of fillers which, because of their chemical reactivity, result in a product of higher solidity than could previously be obtained with fillers which were chemically neutral and in which the solidity of the final product relied solely upon the process of polymerization of the silicone resin.

Whereas the solidity of silicone products as previously made with fillers of chemically inactive materials is very low, even though they be molded under high pressure and be given a long hardening treatment, so that such products may, for example, be easily scraped with a knife, the products made according to the invention have the considerable adavntage of having a solidity similar to that of the usual plastics, and especially those made of highly polymeric carbon compounds.

For this purpose, the present invention provides the application of self-hardening fillers, for example, of the type which undergo a hardening reaction while absorbing water and which include hydraulically hardening materials such as calcium silicate, calcium aluminate, or calcium sulphate. Thus, cement, plaster of Paris, and especially the building material known by the name of aluminous cement or blast furnace slag cement are particularly suitable for the purposes of the invention. Mixtures of 20% of silicone resin and 80% of aluminous cement may be easily molder under pressure and hardened at temperatures up to 300° C. The molded products thus obtained are very hard and show a very high tensile and bending strength, as well as impact bending strength. They also have an excellent dielectric resistance which was found to be as high as $5 \times 10^{12}$ ohms per cm. Such products when made with aluminous cement have a high storage capacity even in water, whereas those made with Portland cement will become soft under water.

During the polymerization of the silicone resin, water will be freed, and it may be safely assumed that such freed water combines with the chemically active fillers. Therefore, it will not be necessary to expel the water from the plastic product, and the danger that the dense structure produced by the molding process might thus be loosened and harmed will be avoided. Insofar as the invention is concerned it may be regarded as immaterial whether or not there may be any other reactions aside from the water absorption which might take place between the silicone and the chemically active filler, the important fact being that a filler be used which itself increases the hardening action of the plastic. Therefore, all those materials will be applicable in accordance with the invention which in any method of hardening the silicone resin as such will themselves undergo a hardening action either by internal transformation or metabolism, or as a result of a reaction with a component prevailing in a reactive state during the hardening of the silicones or produced thereby. Thus the hardening reaction according to the invention is not limited merely to one by hydraulic means as mentioned above but it may also occur through some other chemical transformation. If, for example, slacked lime is used as a filler, the hardening reaction may result from the fact that the $SiO_2$ formed from the silicone resin will produce calcium silicate. During the hardening process it is possible, generally speaking, to form a saline or esterlike compound from a basic, inorganic part and an acid, organic or semiorganic part. Similar hardening reactions may also be applied by using an acid filler, for example, in the form of phosphoric acid or a phosphoric acid compound, which reacts with a basic part of the plastic mixture or of the resin so as to form a hard substance. The basic component in such a case may consist, e.g. of a metal oxide. However, it may also be produced during the hardening process from the silicone resin, e.g. in the form of an amino compound which together with the acid component then enters into a saline or esterlike compound.

The chemically active or self-hardening fillers, that is, those kinds which in turn harden during the hardening process of the silicone resin used as a binder and which thereby provide the plastic objects with the desired qualities, may also be used in the form of self-hardening cements, i.e. substances known in dentistry under the name of dental cement and consisting of mixtures of zinc oxide and phosphoric acid. Another example of such self-hardening fillers which may be used in combination with the silicone resins to form the molded or pressed plastic objects consists in the common water glass cements. For certain purposes it is also possible to apply the well-known litharge glycerine cements. Still another example of suitable fillers to be used according to the invention consists of plaster of Paris or flooring plaster. The respective ingredients should be mixed with the solution of silicone resin, and the organic solvent, for example, toluene, in which the silicone resin has been dissolved, should then be evaporated and the resulting powdery mixture be molded under pressure and thereafter hardened.

A further advantage of the present invention resides in the fact that it does not absolutely require the use of heated dies but that so-called dry-molding dies may be applied, i.e. dies with a filling space as are commonly used in the ceramic industry. In such a case the same amount of material is placed upon the die as is contained in the final molded product, which means that there is no excess of material passing out of the die at the closing edge thereof, or through apertures which may be specially provided therefor.

In determining the ratio of the silicone resin to the filler, the present high cost of silicone resin should be considered, and an effort should therefore be made to use the least amount thereof required in each particular instance. Thus, it has been found that properly molded products may be obtained with no more than 10 to 20% of silicone resin. The proportion in chemically active filler may also be varied, and it is easily possible to replace certain amounts thereof by an inactive filler which might improve the dielectric or other qualities of the final product. Thus, the dielectric coefficient may, for example, be increased by adding 80% of the total amount of filler in the form of barium titanate. If the plastic product should have a high magnetic permeability, the addition may partly consist of ferrites or of magnetic powdered iron. If, on the other hand, the final plastic products are desired to have certain conductive or semi-conductive qualities, suitable metal oxides or metallic powders may be added.

The following examples are given to illustrate some of the numerous forms in which the invention may be applied:

*Example 1*

The following ingredients totaling 120 parts should be thoroughly mixed:

40 parts of silicone-resin solution "K," commercially obtainable under such name from the manufacturer Wacker-Chemie G.m.b.H., at Munich, Germany, and consisting of a 50% solution of a methylpolysiloxane-resin in toluene, and 80 parts of aluminous cement (blast furnace cement), such as described, for example, under the title "Tonerde-Schmelzzement Rolandshütte" (i.e. Aluminous Cement "Rolandshütte") in a special issue of the publication "Die Bauwirtshaft," vol. 39, of September 29, 1951, and having approximately the following composition: 6 to 9% of $SiO_2$, 46 to 50% of $Al_2O_3+TiO_2$, 0.4 to 1% of FeO, 0.3% of MnO, 37 to 42% of CaO, 1.5 to 2% of MgO, 1% of S, and 0.4% of $SO_3$.

After mixing these ingredients, they are heated for about one hour at 100° C. so as to evaporate the solvent completely and to subject the resin to a certain preliminary polymerization. The mixture then remaining consists of 20 parts of resin and 80 parts of filler. Such material is then finely pulverized and molded under adequate pressure in a heated die so that the excess of material will escape through the closing edges of the die or through the discharge channels provided therefor.

If the material should be treated in a manner similar to the dry-molding process used in ceramics, the pre-polymerized mixture should then not be powdered to dust but granulated so as to obtain a granular mass with good filler qualities. This mass is then molded under a pressure of 400 kg./cm.$^2$ in a die having approximately 2.5 times the filling capacity. The molded products are then placed in a suitable heating appliance and heated to a temperature up to 300° C. for a period of 30 minutes and then kept at such a temperature for an additional 30 minutes. Any metal parts desired in the products may be embedded therein during the molding process.

*Example 2*

The following ingredients were treated in the same manner as described in Example 1:

20 parts of a silicone-resin solution "K" (50% dissolved in toluene);
70 parts of ground steatite;
15 parts of zinc oxide; and
5 parts of phosphoric acid.

During the hardening process a reaction takes place between the zinc oxide and the phosphoric acid resulting in an acid zinc phosphate. Such cements as may be applied as fillers together with the silicone-resin to form molded or pressed products according to the invention are well-known in dentistry as porcelain cements or dental cements.

*Example 3*

The following ingredients were mixed:

20 parts of a silicone-resin solution "K" (50% solution in toluol);
80 parts of ground porcelain bodies; and
10 parts of commercial waterglass.

After mixing, the toluol was evaporated and the resulting powdery mixture molded under pressure and then hardened.

*Example 4*

20 parts of a silicone-resin solution "K" (50% solution in toluol);
10 parts of aluminous cement; and
80 parts of barium titanate were mixed and further treated as stated in Example 1.

This mixture is especially suitable for molding sheets or plates for condensers. Foil coating of the dielectric part of the condenser was effected by inserting into the die sheets of tin foil that were embedded in the dielectric material, so that the surfaces of the dielectric plates were formed with tin foil on both sides. Thus, a condenser was obtained of a high capacity in proportion to its content of barium titanate.

Another practical example of the application of the invention to the production of electric insulators may consist of a lead-in insulator for an electric heating appliance as illustrated in the accompanying drawing. A tubular heating element consisting of a brass sleeve 2 carries an insulator 1 serving as a moisture-proof seal and consisting according to the invention of a silicone-resin and a filler which has been hardened by chemical transformation. The heater coil 3 has also been secured in the insulator by being molded therein at the same time and so as to be insulated from the brass sleeve 2.

While the foregoing description sets forth in detail what I regard as the preferred embodiments of my invention, it is to be understood that numerous changes may be made therein without departing from the spirit and scope of the invention as defined in the appended claims.

Having thus described my invention, what I claim as new is:

1. A process for forming hard, solid, heat-resistant molded objects containing a silicone resin binder, comprising mixing together appropriate amounts of a solution in a volatile solvent of a silicone resin that releases water upon polymerization, and a dry particulate inorganic hydraulically hardening substance that will hydrate to take up the water released by said resin as it is polymerized and that hardens upon hydration, and polymerizing said resin, simultaneously to hydrate said substance and harden it.

2. A process for forming hard, solid, heat-resistant molded objects containing at least about 10% of silicone resin by weight, comprising mixing together appropriate amounts of a solution in a volatile solvent of a silicone resin that releases water upon polymerization, and at least 10% by weight, based on the dry weight of said mixture, of a dry inorganic hydraulically hardenable substance that hydrates to take up the water released by said resin as it is polymerized and that hardens upon hydration; and then heating said mixture to polymerize said resin, simultaneously to hydrate said substance and harden it.

3. A process for preparing a dry particulate molding material for use in forming under pressure at an elevated temperature hard, solid, heat-resistant molded objects containing at least about 10% of silicone resin by weight, comprising mixing together appropriate amounts of a solution in a volatile solvent of a silicone resin that releases water upon polymerization, and a dry inorganic hydraulically hardenable substance that hydrates to take up the water released by said resin as it is polymerized and that hardens upon hydration; heating said mixture to remove said solvent therefrom to produce a dry material; and comminuting said dry material to produce a dry, particulate molding material that can be heated simultaneously to polymerize said resin and to hydrate and to harden said substance.

4. A process for forming under pressure at an elevated temperature hard, solid, heat resistant objects containing at least about 10% by weight of silicone resin, comprising mixing together a solution in a volatile solvent of a silicone resin that releases water upon polymerization, and a dry inorganic hydraulically hardenable substance that hydrates to take up the water released by said resin as it is polymerized and that hardens upon hydration; heating said mixture to remove said solvent to produce a dry material; comminuting said dry material to convert it to particulate form, molding said particulate material under pressure, and heating said molded material to harden it.

5. A process for forming under pressure at an elevated temperature hard, solid, heat resistant objects containing at least about 10% by weight of silicone resin, comprising mixing together a solution in a volatile solvent of a silicone resin that releases water upon polymerization, and at least 10% by weight, based on the dry weight of said mixture, of an inorganic hydraulically hardenable substance that hydrates to take up the water released by said resin as it is polymerized and that hardens upon hydration; heating said mixture to remove said solvent to produce a dry material; comminuting said dry material to convert it to particulate form; shaping said particulate material in a mold under pressure, and heating said molded material to polymerize said resin and to effect hydration of said substance.

6. A molded insulator consisting essentially of a heat-polymerized silicone resin of the type liberating water during polymerization, and a hydraulically hardenable substance that has been hardened by hydration, said insulator being produced by mixing together said substance in a dry state and a solution in a volatile solvent of said silicone resin, and thereafter polymerizing said resin, simultaneously to hydrate said substance and harden it.

7. A molded insulator consisting essentially of at least about 10% by weight of a heat-polymerized silicone resin of the type liberating water during polymerization, a hardening binder consisting essentially of at least 10% by weight of said insulator on a dry basis of a hydraulically hardenable substance that has been hardened by hydration; and an inert dielectric filler; said insulator being produced by mixing together said cement and said dielectric filler in a dry state, and a solution in a volatile solvent of said silicone resin, and thereafter polymerizing said resin, simultaneously to hydrate said substance and harden it.

8. An electric heater element comprising a tube, an electrical resistance element mounted axially within said tube, and a molded insulator sealing at least one end of said tube and having electrical conducting means passed therethrough to carry current for said resistance element, said insulator being molded and consisting essentially of at least 10% by weight of a heat-polymerized silicone resin of the type liberating water during polymerization, and a hardening binder comprising at least 10% by weight of said insulator on a dry basis of a hydraulically hardenable substance that has been hardened by hydration; said insulator being produced by mixing together said binder in a dry state and a solution in a volatile solvent of said silicone resin, and thereafter polymerizing said resin, simultaneously to hydrate said substance and harden it.

References Cited in the file of this patent

UNITED STATES PATENTS

| | | |
|---|---|---|
| 2,258,218 | Rochow | Oct. 7, 1941 |
| 2,272,282 | Wiegand | Feb. 10, 1942 |
| 2,388,299 | Thielemann | Nov. 6, 1945 |
| 2,460,795 | Warrick | Feb. 1, 1949 |
| 2,465,188 | Barry et al. | Mar. 22, 1949 |
| 2,491,487 | Faulwetter | Dec. 20, 1949 |
| 2,495,306 | Zurcher | Jan. 24, 1950 |
| 2,546,474 | Peyrot | Mar. 27, 1951 |
| 2,559,791 | Peyrot | July 10, 1951 |
| 2,588,828 | Grewer | Mar. 11, 1952 |
| 2,601,212 | Polydoroff | June 17, 1952 |
| 2,635,084 | Chevalier | Apr. 14, 1953 |

OTHER REFERENCES

Lea: "Chemistry of Cement and Concrete," 1936.